Apr. 24, 1923.                                                    1,453,028
S. S. TOOKER
ANTIFRICTION BEARING AND SHAFT CENTERING DEVICE
Filed Oct. 11, 1921
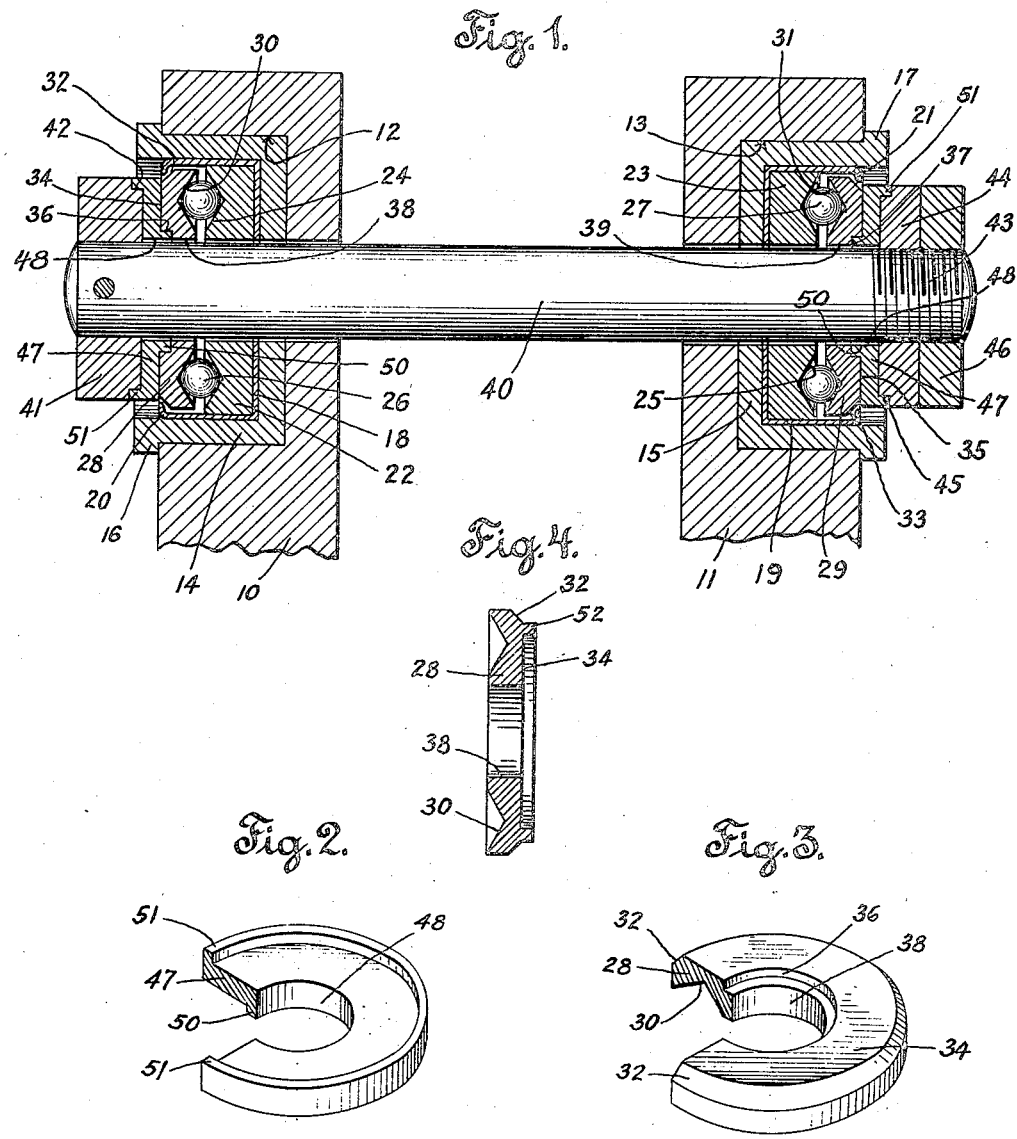
INVENTOR
S. S. Tooker
BY
Charles L. Wright, ATTORNEY Patented Apr. 24, 1923.

1,453,028

UNITED STATES PATENT OFFICE.

SIDNEY S. TOOKER, OF ROCHESTER, NEW YORK.

ANTIFRICTION BEARING AND SHAFT-CENTERING DEVICE.

Application filed October 11, 1921. Serial No. 507,105.

*To all whom it may concern:*

Be it known that I, SIDNEY S. TOOKER, a citizen of the United States, and a resident of Rochester, in the county of Monroe and State of New York, have invented certain new and useful Improvements in Antifriction Bearings and Shaft-Centering Devices, of which the following is a specification.

The principal purpose of this invention is to produce means for adjusting machine bearings, with special reference to anti-friction bearings of the ball type, as used in supporting and guiding shafts mounted axially therein and avoid end play or longitudinal movement of the shaft.

A further object is to provide means for preventing friction and also vibration of the shaft, even at high speed and varying load, without excessive tension on the bearings.

Another object is in the provision of an automatic, simple, efficient and inexpensive device that will effectually maintain a shaft in true axial relation to its bearings, at all times, irrespective of wear and varying conditions, such as these types of bearings are commonly subjected to, and which require no special attention after initial adjustment.

These and other analogous objects are attained by the novel construction, combination and arrangement of parts hereinafter described and shown in the accompanying drawing, forming a material part of this disclosure, and in which:—

Figure 1 is a longitudinal central sectional view taken through a pair of bearings made in accordance with the invention, showing a conventional shaft mounted therein.

Figure 2 is a perspective view of the centering washer used in connection with the bearings, the same being broken away in order to clearly disclose its construction.

Figure 3 is a similar view of the ball bearing race as recessed to receive and cooperate with the central flanged element or hub of the washer.

Figure 4 is a transverse sectional view showing a modification in which the race and washer are combined to form a unit.

Referring to the drawings in detail, the numerals 10 and 11 designate respectively the side elements of a machine frame or body, the same having in their outer sides alined circular recesses 12 and 13 into which are tightly fitted sockets 14 and 15 having outwardly extending beaded or flanged edges 16 and 17.

These sockets are suited to receive cups 18 and 19, usually made of drawn sheet metal, and adapted to have their outer edges spun inwardly, as at 20 and 21, to hold the elements of the ball bearings in proper assembled relation, these cups also acting as dust guards.

It will be understood that the showing of the frames is merely conventional, illustrative only of common conditions, and also that the sockets may be dispensed with, their use not being essential for the purpose of the invention.

Fitted to seat snugly in the cups 18 and 19 and pressed against their integrally flanged bottoms, are the ball seats 22 and 23, the same having annular grooves 24 and 25 in their outer faces receptive of the balls 26 and 27, in number and size to meet the requirements of the bearing, it being understood that these balls are hardened, ground and sized very accurately in exact uniformity and that the ball seats and races, as further on described, are also hardened and their grooves, as well as their entire exterior, carefully and precisely finished by grinding.

These races 28 and 29 contain matching grooves 30 and 31, for the balls, so formed and proportioned that spaces exist between their adjacent faces.

The races are slightly less in diameter than their corresponding seat elements, being loose in the cups 18 and 19 and on the shaft 40, and have their outer edges 32 and 33 bevelled in conformity with the inturned edges 20 and 21 of the cups, thus preventing displacement of the structure and the entrance of foreign matter.

The outer surfaces 34 and 35 of the races are finished parallel with their grooves and are provided with circular recesses or countersunk depressions 36 and 37 concentric to their central openings 38 and 39, through which the shaft 40 freely passes.

This shaft also passes freely, without contact, through appropriate openings in the frames, sockets, cups and seats as will be clearly evident.

At one end of the shaft is rigidly secured a disc or collar 41 having an annular recess 42 in its inner edge. The other end of the shaft is provided with screw threads 43 to which is fitted a clamp nut 44, having a recessed inner edge 45 similar to that of the disc 41, and a check nut 46 for maintaining the clamp nut is also provided.

Intermediate the disc 41 and race 28 and also between the clamp nut 44 and race 29 are washers 47 alike in construction and, like the other elements of the bearing, preferably hardened and ground.

These washers contain openings 48 fitted to pass loosely over the shaft 40 and formed on one of their inner sides are annular extensions or hubs 50 fitting respectively the recesses 36 and 37 of the ball races.

The rims of these washers are also flanged or extended on the sides opposite the hubs, these flanges 51 being received respectively in the recess 42 of the disc and the corresponding recess 45 of the clamp nut, and it is to be noted that these washers are so disposed as to be protected by the flanged edges 16 and 17 of the sockets.

From the foregoing it will be seen that the shaft 40 is floatingly held in the bearings, being confined entirely through the intermediary of the washers 47, which transmit the load on the shaft to them through the disc and clamp nut, and by the washers, through the races, balls, seats cups and sockets to the frames, thus compensating for any wear that may occur or imperfections of the parts, and it will be clearly apparent that any looseness in the bearings or end movement of the shaft can be corrected by properly adjusting the nuts at the end of the shaft.

In the modification, shown in Figure 4, the race and washer are formed as a unit, the race element being provided on its outer side with an extending annulus 52 in all respects similar to the flanged rim 51 of the washer and performs the same functions with respect to the disc or nut.

Although the foregoing is descriptive of the preferred embodiment of the invention, it will be apparent that minor changes may be made in its construction, without the exercise of invention or conflicting with the scope of the claims hereto appended.

Having thus described my invention, what I claim as new and desire to secure by Letters Patent, is:—

1. An anti-friction bearing comprising a cup, a seat fitted tightly therein, a race loose in said cup, an annular row of balls disposed in recesses formed in the adjacent sides of said seat and race, an annular projection on the side of said race, a shaft loosely mounted in the bearing, free of said cup, race and seat and means carried by said shaft adapted to engage said projection whereby the shaft is held central.

2. An annular anti-friction bearing comprising a ball seat, a race opposite said seat, said race and seat being grooved on adjacent sides, balls in the mentioned grooves, a cup encircling said seat and race, a peripheral flange on said race extending outward beyond the edge of said cup, and means engaging said flange for causing axial registration of a shaft engaging said flange.

3. In combination with an annular ball bearing including a ball race having a recess concentrically adjacent its axial opening, a washer having a hub fitted to the recess and an oppositely extending peripheral flange, a shaft passing loosely through said race, and an element rigid with said shaft, said element being recessed to suit the flanged rim of said washer.

4. An annular ball bearing comprising in combination with a support frame and a shaft passing loosely therethrough, a cup in said frame, a seat fixed in said cup, a race free in said cup, said seat and race being grooved, balls in the grooves of said seat and race, means formed with said cup preventing separation of said seat and race, a washer having a hub extending into a recess in said race, a peripheral flange on said washer extending opposite its hub, and a disc fixed on said shaft, said disc having its adjacent face recessed to receive the flange of said washer and being adapted to floatingly support said shaft.

In testimony whereof I have signed my name to this specification.

SIDNEY S. TOOKER.